United States Patent
Hisey

Patent Number: 6,133,656
Date of Patent: Oct. 17, 2000

[54] BRUSHLESS COMMUTATED TORQUE MOTOR FOR USE WITH A ROTARY LOW FREQUENCY SOUND REPRODUCING APPARATUS

[76] Inventor: Bradner L. Hisey, 19325 Athos Pl., Saratoga, Calif. 95070

[21] Appl. No.: 09/165,906

[22] Filed: Oct. 2, 1998

Related U.S. Application Data

[63] Continuation-in-part of application No. 08/505,334, Aug. 18, 1995, Pat. No. 5,825,901.

[51] Int. Cl.$^7$ .................................................. H02K 11/00
[52] U.S. Cl. .................. 310/68 C; 310/68 B; 310/68 E; 310/179; 310/103; 310/156; 318/254; 318/138; 318/203
[58] Field of Search ............................... 310/68 C, 68 B, 310/36, 68 E, 93, 179, 103, 156; 318/138, 254, 203

[56] References Cited

U.S. PATENT DOCUMENTS

| | | | |
|---|---|---|---|
| 3,501,664 | 3/1970 | Veillette | 318/138 |
| 3,579,277 | 5/1971 | Imahashi | 310/156 |
| 3,978,356 | 8/1976 | Spiesberger | 310/164 |
| 4,030,007 | 6/1977 | Price et al. | 318/744 |
| 4,096,420 | 6/1978 | Gosling et al. | 318/254 |
| 4,197,489 | 4/1980 | Dunn et al. | 318/138 |
| 4,525,657 | 6/1985 | Nakase et al. | 318/254 |
| 4,703,236 | 10/1987 | Janssen | 318/254 |
| 5,191,618 | 3/1993 | Hisey | 381/158 |
| 5,327,054 | 7/1994 | Gleim | 318/255 |
| 5,329,195 | 7/1994 | Horber et al. | 310/68 B |
| 5,428,276 | 6/1995 | Carobolante et al. | 318/254 |
| 5,825,901 | 10/1998 | Hisey | 381/165 |
| 5,838,122 | 11/1998 | Vu | 318/254 |

*Primary Examiner*—Clayton LaBalle
*Assistant Examiner*—Thanh Lam
*Attorney, Agent, or Firm*—Skjerven, Morrill MacPherson LLP

[57] ABSTRACT

A brushless commutated torque motor suitable for use with a rotary low frequency sound reproducing apparatus, includes a shaft having a longitudinal axis, a position sensor, a rotor having a plurality of permanently magnetized rotor pole sectors, the rotor being mounted for rotation upon the shaft, and a stator having a plurality of stator poles and stator winding slots disposed alternately therein, the stator slots having stator windings therein driven by individual power amplifiers in response to a control signal, the stator having commutation between stator windings controlled by sensing of rotor angular position by the position sensor, with each rotor pole sector being configured and disposed such that a plurality of stator poles are axially adjacent to each rotor pole sector and each rotor pole sector is angularly separated from adjacent rotor pole sectors by a selective number of stator poles.

20 Claims, 3 Drawing Sheets

BRUSHLESS COMMUTATED TORQUE MOTOR FOR USE WITH A ROTARY LOW FREQUENCY SOUND REPRODUCING APPARATUS

RELATED APPLICATIONS

The present invention is a continuation-in-part of application Ser. No. 08/505,334, entitled "Rotary Low-Frequency Sound Reproducing Apparatus and Method" by Bradner L. Hisey, filed on Aug. 18, 1995 now U.S. Pat. No. 5,825,901 issued on Oct. 20, 1998, which is incorporated herein by reference in its entirety.

FIELD OF THE INVENTION

This invention relates to a rotary low frequency sound reproducing apparatus and brushless commutated torque motor suitable for use therein, as well as in other applications.

BACKGROUND OF THE INVENTION

The reproduction of the first two octaves of audible low-frequency sound, from 20 to 80 Hz, is a long-standing problem in that large volumes of air must be moved. For a given loudness of a reproduced low-frequency sound, the air volume moved must be doubled for each halving of reproduced sound frequency.

Many solutions have been attempted. Low-frequency voice-coil-and-cone loudspeakers with highly compliant suspensions have been used. However, the long cone travels needed are difficult to achieve with linearity. Nonlinearities introduce intermodulation distortion, the modulation of higher reproduced frequencies by lower reproduced frequencies. More serious attempts to produce the lowest frequencies in sound isolate the lower two octaves from higher frequencies for reproduction through "subwoofer" loudspeakers.

Direct radiator voice-coil-and-cone loudspeakers, which have at best an efficiency of a few percent, have been used as subwoofers in 12 to 30 inch frame sizes in large cabinets of several cubic feet in volume. Required driving powers are also large, typically several hundred watts. Subwoofer low-frequency response is limited by resonance of the voice-coil-and-cone masses in combination with compliance of the voice-coil support "spider", the cone flexible surround, and the air compliance of a closed cabinet, if used. Together these set an effective lower limit to the frequencies of output sound since it is difficult to drive a loudspeaker below its low-frequency resonance. Closed-loop (negative feedback) servomechanisms controlling voice-coil movements have been used to reduce these effects but they may leave the cone and flexible surround free to flex in unwanted modes at high amplitude, limiting usable power output by the onset of distortion.

In auditoria and stadia, horn-type radiators driven by fairly conventional voice-coil-and-cone transducers have also been used as subwoofers with efficiencies in the 0 to 50 percent range. Their limitation in the domestic environment is that for reasonable performance the perimeter of the horn mouth must be of the order of the wavelength of the lowest reproduced sound, e.g., over 50 feet at 20 Hz. Recently, horns of the type disclosed in U.S. Pat. No. 4,564,727 have been driven from externally cooled servomotors through pulley, belt, and cone arrangements, achieving remarkable sustained acoustic outputs.

Most recently, in U.S. Pat. No 4,763,358, the use of a positive-displacement rotary-vane pump is disclosed. If of suitable size it should be able to produce usable output to and below the 20 Hz limit of audibility. The rotary vane pump may be used to drive a horn, though the required horn mouth size (above) practically excludes it from the domestic user environment. If used as a direct radiator, rotary vane pump efficiency is similar to that of voice-coil-and-cone direct radiators. At high output, most of the input power must be dissipated as heat, usually from within a closed cabinet. Though their volumetric efficiency is high relative to that of voice-coil-and-cone loudspeakers, since much of rotary vane device volume may be swept by the vanes, the devices and their cabinetry can be large. Cabinetry structure for devices having only full-length ports in pump-enclosure sidewalls is awkward. Motor wear and noise, bearing noise, and seal-leakage noise can be problematic in a quiet, e.g., home or auto, user environment. Port-turbulence noise must be managed—a nominal 15 inch diameter, 9 inch long rotary acoustic radiator moves about 6 times the air volume in a single stroke as does a conventional 15 inch loudspeaker.

Position sensing has heretofore been disclosed for rotary acoustic radiators to provide negative feedback information active in the same frequency band as the acoustic output and linearize vane travel. This approach has been used successfully in voice-coil-and-cone loudspeakers, which are linear at null or neutral position. Rotary acoustic transducers are not linear at null. The support bearings of rotary devices have static friction differing severalfold from dynamic friction, and both static and dynamic friction vary with temperature and time. Dynamic friction, determined more by grease seals than by the bearings themselves, increases with rotational velocity.

Bearing, slip ring, and motor-brush static friction induce distortion at low output amplitudes. Total breakaway (from stop) torques, which are typically 2 percent of full motor torque, are 20 percent of torque when the audio output level is down 20 db, and further increase the relative distortion level with decreasing output. Since the usual dynamic range of entertainment audio is 40 to 50 db, such distortions at mid and low amplitudes are serious problems. Commutation discontinuities and irregularities of motor magnetic fields also contribute somewhat unpredictably to low-amplitude output distortion, as their magnitude is often a discontinuous function of motor armature rotational position.

Negative feedback adequate to contain these nonlinearities to a user-acceptable level would likely be 14 db or more, implying a corollary unity-gain negative feedback loop crossover in the region of 300 Hz or higher. Stability is difficult to assure over a subwoofer's life with such nonlinear electromechanical components and high bandwidth in a negative feedback loop.

Commutated motors, when used to drive acoustic transducers, introduce a special problem. A wide variety of techniques have been employed to reduce the characteristic of commutated motors commonly referred to as torque cogging or torque ripple, hereinafter referred to as torque ripple, which is the principal distortion-generating limitation of commutated motors when employed in rotary acoustic transducers. These ripple effects occur when windings connected to rotationally adjacent commutator sectors are shunted together by brushes. Brushless motors having multipole permanent magnet rotors and multiphase stator windings, particularly those having precision angular position information available for use in commutation such as computer memory disk drives and the rotary acoustic transducer of this invention, can be commutated without the positional uncertainty and torque ripple arising through use of mechanical brushes. With electronic commutation angular gaps may be introduced between stator connections during commutation to minimize inductive and ferromagnetic hysteresis effects in stator windings during phase connection and disconnection, as in Janssen U.S. Pat. No. 4,703,236. Separate windings for each pole set in a multiphase motor which share a single driving source, such as a power amplifier, can limit the electromagnetic disturbance during an event of commutation to one or two pole sets, rather than disturbing the entire stator during each commutation as in conventional lap or wave stator finding patterns wherein all stator poles share the same winding circuit.

Torque ripple is reduced by the accurate commutation described hereinabove. Nevertheless in brushless motors stator winding commutation generally occurs adjacent to rotor pole edges and is a source of torque ripple as stator pole magnetic flux reverses and stator pole flux transfers from one rotor pole to the next. Additional sources of torque ripple are cogging of the rotor from pole to pole of the stator due to uneven flux distribution cross pole faces and winding slots, flux variations across the faces of stator poles themselves, and pole saturation. These sources of torque ripple have been compensated by using large numbers of stator poles; using numbers of rotor and stator poles which are not multiples or submultiples of each other; skewing the stator poles from their usual radial or axial alignments in axial-gap and radial-gap motors, respectively; shaping the stator pole faces, as with surface depressions, to produce a desired flux distribution, as in Hertrich, U.S. Pat. No. 4,874,975; and modulating the stator winding drive current with a repetitive pattern in synchrony with the multipole rotor assembly angular rotation over stator poles, as in Nakase et al., U.S. Pat. No. 4,525,657.

There is therefore a need to address these problems of low-frequency sound transducers, and in particular rotary-vane transducers, to produce a low-frequency sound reproducing apparatus and method more suitable for the consumer environment.

SUMMARY OF THE INVENTION

In accordance with this invention, a brushless commutated torque motor is provided which includes a shaft having a longitudinal axis, a position sensor, a rotor having a plurality of permanently magnetized rotor pole sectors, the rotor being mounting for rotation upon the shaft, and a stator having a plurality of stator poles and stator winding slots disposed alternately therein, the stator slots having stator windings therein driven by individual power amplifiers in response to a control signal, the stator having commutation between stator windings controlled by sensing of rotor angular position by the position sensor, with each rotor pole sector being configured and disposed such that a plurality of stator poles are axially adjacent to each rotor pole sector and each rotor pole sector is angularly separated from adjacent rotor pole sectors by a selective number of stator poles. In accordance with this embodiment, during operation electronically controlled commutation occurs in the stator windings not axially adjacent to the rotor pole sectors.

In one embodiment, the electronic commutation between the stator windings occurs gradually during angular travel of the rotor with the gradual commutation being controlled by electronic sensing of the angular position of the rotor.

In another embodiment of the invention, during operation the commutation positions for a given stator winding occur at one angular position for a given direction of stator winding current commutation polarity change and at another angular position for a stator winding current commutation polarity change of opposite direction such that there is an angular gap or hysteresis between the two commutation angular positions for a given stator winding. As a result, for low amplitude oscillations less than the hysteresis amplitude, commutation is eliminated.

In still another embodiment of the invention, a microcomputer control calibrates the motor torque linearity as a function of rotational position and driving current amplitude so as to compensate for torque motor nonlinearity.

In still another embodiment, an even number of rotor poles is used together with an unequal angular disposition of diametrically-opposed rotor pole pairs about the motor longitudinal axis.

This invention will be more fully understood in conjunction with the following detailed description taken together with the drawings.

DESCRIPTION OF THE PREFERRED EMBODIMENTS

The rotary acoustic transducer apparatus of the present invention is used for producing low frequency sound in response to an applied audio signal. It is comprised of a rotary acoustic radiator assembly, a torque motor, a position sensor and a microcomputer. The apparatus may also be provided with a supporting cabinet. The radiator assembly comprises a generally cylindrical means with a cylindrical side wall and end walls forming a cylindrical chamber having an axis. A shaft is provided. Bearings mount the shaft in the cylindrical means for rotation about said axis. A cylindrical hub is secured to the shaft and extends between the end walls. Movable vanes are secured to the shaft. The shaft and hub and movable vanes form a rotor assembly. Stationary vanes are mounted in the chamber between said moving vanes and extend between the cylindrical side wall and the hub and between the end walls. The cylindrical means has ports opening through the cylindrical chamber walls to permit air flow into and out of the cylindrical chamber in response to movement of the movable vanes. A torque motor is coupled to the shaft for applying rotational reciprocating movement to the movable vanes. A position sensor, which may use direct rotational position sensing or indirect rotational position sensing by integration of velocity or acceleration, ascertains the position of said rotor assembly. Typically an incremental position sensor would be used to provide high resolution at low cost, but alternatively absolute position sensors may be used—they do not require a separate indexing line or procedure as described hereinbelow. A microcomputer is provided and is coupled to the torque motor and to the position sensor and controls the operation of the torque motor in accordance with the applied audio signal. Nonlinearities arising in the torque motor, bearings, seals, and cabinet are measured by the position sensor and microcomputer and correcting signals created to modify the applied audio signal. Displaced air may be used as a torque motor coolant. A diffuser-attenuator slows user-side airflows and permits small user-side ports to be used, increasing volumetric efficiency. The diffuser-attenuator is fabricated partially of acoustically-absorbent materials to attenuate vane-edge leakage noise and port-turbulence noise.

Figure 1:
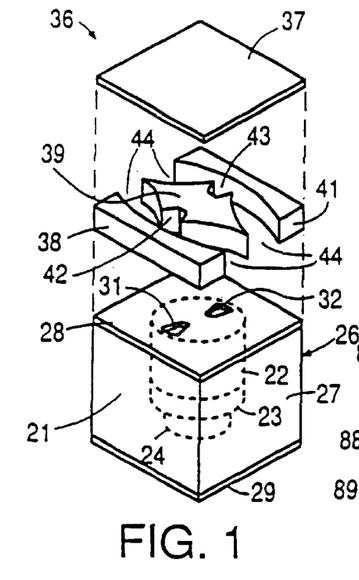
FIG. 1 is a partially exploded, isometric view of a loudspeaker cabinet incorporating the rotary acoustic transducer apparatus incorporating the present invention.

More particularly, as shown in FIG. 1 of the drawings, the rotary low-frequency sound producing apparatus 21 which alternatively can be called a rotary acoustic transducer apparatus is comprised of rotary acoustic radiator assembly 22, a torque motor 23 and a position sensor 24, said apparatus typically being supported by a cabinet 26. A typical cabinet 26 is provided with four side walls 27, a top wall 28 and a bottom wall 29 to form a rectangular cabinet or enclosure. The top wall 28 is provided with ports 31 and 32. The rotary acoustic radiator assembly 22 is secured to the wall 28 by suitable means, such as bolts (not shown) so that the ports 31 and 32 in the cabinet top wall 28 register with the ports hereinafter described in the rotary acoustic radiator assembly 22. Cabinet minimum volume is in the range of three to ten times the maximum air volume which may be displaced by the rotary acoustic radiator assembly 22 in a single stroke of the rotary acoustic radiator assembly 22.

A diffuser-attenuator 36 is comprised of a top planar baffle 37 overlying and spaced upwardly from the cabinet top wall 28. The top baffle 37 has approximately the same area as the top wall 28 of the cabinet 26, and is spaced upwardly from the cabinet top wall 28 a suitable distance, as for example one fourth of the diameter of the rotary acoustic radiator assembly diameter 22. Fixed air duct baffle means 38, 39, and 41 are provided between the top baffle 37 and the cabinet top wall 28. The top baffle 37 is supported on the cabinet top wall 28 by spacer and bolt assemblies (not shown) placed as appropriate to support the top baffle 37 and inhibit vibration of the top baffle 37. Air from the ports 31 and 32 enters the diffuser-attenuator 36 through slots 42 and 43 and is redirected so that it exits in the four mouths 44 in the diffuser-attenuator between the top baffle 37 and cabinet top wall 28. Air exiting from the ports 31 and 32 of the cabinet 26 can have considerable kinetic energy which, as the air passes through the diffuser-attenuator 36, is converted to potential energy in a sound wave by reducing air velocity. Air entering the ports 31 and 32 is driven by the potential energy of ambient air pressure and is shaped into a rapidly-moving air column. Though nomenclature is similar, no attempt is made to make the diffuser-attenuator 36 function as a traditional acoustic horn radiator.

Figure 2:
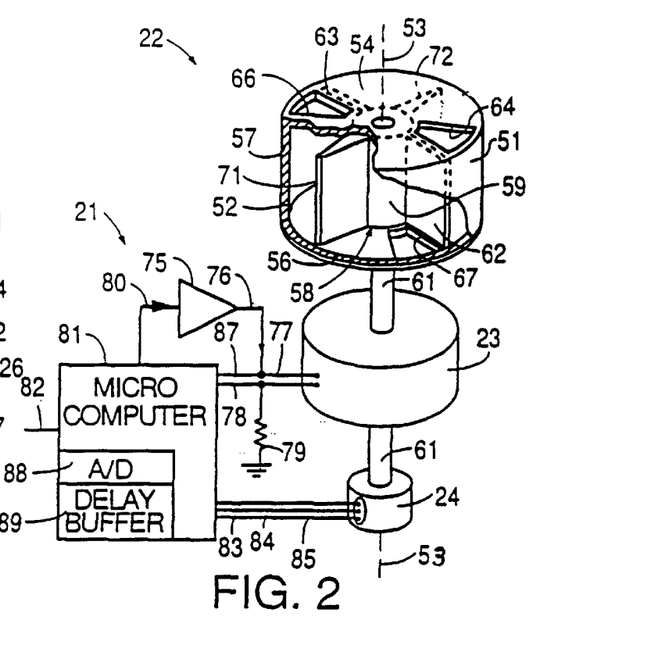
FIG. 2 is a schematic isometric partially exploded view of the rotary acoustical transducer apparatus with certain portions broken away and an overview of its control system.

FIG. 2 is a schematic illustration of the low-frequency sound reproducing apparatus 21 without a cabinet 26. As shown, the rotary acoustic radiator assembly 22 consists of a right circular cylinder or enclosure 51 formed by a cylindrical sidewall 52 which has a longitudinal axis 53. First and second or top and bottom spaced apart parallel circular end walls 54 and 56 adjoin the cylindrical sidewall 52 to form a closed cylindrical chamber 57. A rotor assembly 58 is mounted in the right circular cylindrical chamber 57 and is comprised of a cylindrical hub 59 which is adapted to rotate on the longitudinal axis 53 coaxial with the cylindrical sidewall 52 by a shaft 61. The cylindrical hub 59 extends between the first and second end walls 54 and 56 and is rotatably carried by the shaft 61. The shaft 61 extends coaxially of the hub 59 and is rotatably mounted in the end walls 54 and 56 by suitable anti-friction bearings (not shown). In the embodiment of the invention shown in FIG. 2, the shaft 61 extends through the second end wall 56 for a purpose hereinafter described. It should be appreciated that if desired, the shaft 61 can be formed in two parts and need not necessarily extend through the hub 59. For example, the two parts may be secured to opposite ends of the hub 59.

First and second stationary vanes 62 and 63 are mounted within the chamber 57 of the right circular cylinder 51 and extend radially of the chamber 57 between the cylindrical sidewall 52 and the hub 59 and between the first and second end walls 54 and 56. Thus, as shown the stationary vanes 62 and 63 can be secured to the cylindrical sidewall 52 and the first and second end walls 54 and 56 and can extend into very close proximity to the hub 59 but not touching same so as to frictionally engage the hub and impede rotational movement of the rotor assembly 58.

First and second ports 64 and 66 in the form of radial sectors are provided in the first end wall 51 and are disposed counterclockwise adjacent to the stationary vanes 62 and 63. Thus, as shown in FIG. 2, a port 64 is provided in end wall 54 adjacent to stationary vane 62 and a port 66 is provided in the end wall 56 adjacent to the stationary vane 63. In a similar manner ports 67 and 68 (not shown in FIG. 2) in the form of radial sectors are disposed in the second end wall 56 clockwise adjacent to stationary vanes 62 and 63, respectively. The ports 64, 66, 67 and 68 may have a wide variety of configurations, as described hereinafter.

The rotor assembly 58, in addition to the hub 59 and the shaft 61 includes first and second movable vanes 71 and 72 which are secured to the hub 59 and extend radially therefrom into very close proximity to the cylindrical sidewall 52. They also extend between the first and second end walls 54 and 56 but do not frictionally engage them. The movable vanes 71 and 72 may be tapered as shown to provide greater thickness and strength at the roots or proximal extremities of the vanes to resist motor torque while being narrower at the tips or distal extremities to provide low mass and hence low rotational moment of inertia. The movable vanes 71 and 72, which are subject to large accelerating torques from the torque motor 23 and large air pressure forces generated within a cabinet 26, must necessarily have a rigid structure. These rigid structures are not a source of harmonic distortion as are the more flexible cone and cone-surround components of a conventional loudspeaker.

The large hub 59 reduces the angle about the longitudinal axis 53 subtended by the thickness of the inner or axial margins of the stationary vanes 62 and 63 while containing the robust structure including the hub 59 securing the movable vanes 71 and 72 to the shaft 61. Most of the hub included volume may be structural foamed plastic which contributes little to the rotational moment of inertia of the rotor assembly 58.

The right circular cylinder 51 and the stationary vanes 62 and 63 and movable vanes 71 and 72 may be formed of a number of suitable materials such as metal or composites provided they are dimensionally stable and have closely matched thermal expansion characteristics. Use of the rotary acoustic radiator assembly 22 as a heat sink for the torque motor 23 favors the use of high-thermal-conductivity metal such as aluminum for these components.

The control functions of the rotary acoustic radiator assembly 21 are discussed in some detail hereinbelow; an overview is shown in FIG. 2. The torque motor 23 serves as means for applying rotational reciprocating movement to the rotor assembly 58 through the shaft 61. The drive signal to the torque motor 23 is provided by a power amplifier 75 through lines 76 and 77 with a ground return line 78 connected to ground through a low resistance armature-current sampling resistor 79. A driving signal for the power amplifier 75 is provided on a line 80 from a microcomputer 81 which has as its primary input a low-frequency audio signal applied on line 82. The position sensor 24 provides position information of the rotor assembly 58 to the microcomputer 81 through lines 83 and 84. Another line 85 from the sensor 24 to the microcomputer 81 serves as a ground line. Armature current information is provided to the microcomputer 81 on a line 78 in the form of the voltage drop across resistor 79. Line 87 to the microcomputer 81 samples the drive voltage applied to the torque motor 23.

In FIG. 2 the microcomputer 81 includes analog to digital (A/D) and digital to analog (D/A) converters 88 for converting signals between analog and digital forms as appropriate for processing in the microcomputer 81 and other electronic components of the rotary transducer assembly 21. The microcomputer 81 also includes a delay buffer 89 for management of distortion, as described in parent application Ser. No. 08/505,334, now U.S. Pat. No. 5,825,901, issued Oct. 20, 1998. Alternatively A/D, D/A, delay buffer, rotor assembly 58 position, angular velocity, and angular acceleration functions may be determined with circuitry external to the microcomputer 81, as for example an application-specific integrated circuit (ASIC). This configuration is shown in the more detailed drawing of the control system shown in FIG. 2b of parent application Ser. No. 08/505,334, now U.S. Pat. No. 5,825,901, issued Oct. 20, 1998.

Operation of the rotary transducer assembly 21 shown in FIG. 2 may now be described. As the shaft 61 is rotated counterclockwise by the torque motor 23, the hub 59 and the movable vanes 71 and 72 secured thereto are moved to cause air to be drawn into (inducted into) the ports 64 and 66 at the first end wall 54 of the right circular cylinder 51 and air forced out of (exhausted from) the ports 67 and 68 on the second end wall 56 of the right circular cylinder 51. When rotation of the hub 59 and the movable vanes 71 and 72 is reversed, air is exhausted from the ports 64 and 66 and inducted into ports 67 and 68. Air leakage between the movable vanes 71 and 72 and the cylinder sidewall 52 and the end walls 54 and 56 and between the stationary vanes 62 and 63 and the hub 59 is limited by providing very close fits between the same, typically one one-thousandth of the internal diameter of the cylinder sidewall 52.

As described hereinabove, a rotary acoustic transducer assembly 21 includes a number of distortion sources which must be corrected or compensated to produce a user-satisfactory apparatus. These corrections are first derived in a startup protocol; some are updated during subsequent operation of the apparatus.

When power is first applied the microcomputer 81, in conjunction with the A/D and D/A converters 88, the power amplifier 75, the signal delay buffer 89, the position sensor 24 and the armature current-sensing resistor 79, performs a number of initializing functions in a startup protocol comprised of rotor assembly 58 centering, torque motor 23 linearity calibration, damage-protection braking table generation, cabinet 26 volume measurement, rotor assembly 58 air leakage measurement, bearing friction measurement, and armature resistance measurement. Following the startup protocol the applied audio signal $V_{in}$ 82 is operated on by the microcomputer 81 to produce minimal distortion in the reproduced sound, and other signals are originated as necessary within the microcomputer 81 to manage and protect the rotary transducer assembly 21. In the present invention, the techniques used when reproducing sound, with the exception of centering as described hereinbelow, are considered to be forward corrections, estimations, or predictions based on accumulated historical data, as distinguished from negative feedback; during the startup protocol several processes utilize negative feedback of limited bandwidth—under 10 Hz.

Execution of the startup protocol can be lengthy, particularly if the fit of rotor assembly 58 to cylindrical enclosure 51 is close, minimizing air leakage, and the cabinet 26 is not vented to abbreviate pressure equalization. Since data collected during the startup protocol is reasonably stable and may be stored in computer memory, startup functions may be exercised selectively; intervals between executions of specific startup protocol functions may be scheduled or executed on command. This is described in parent application Ser. No. 08/505,334, now U.S. Pat. No. 5,825,901, issued Oct. 20, 1998.

Figure 3:
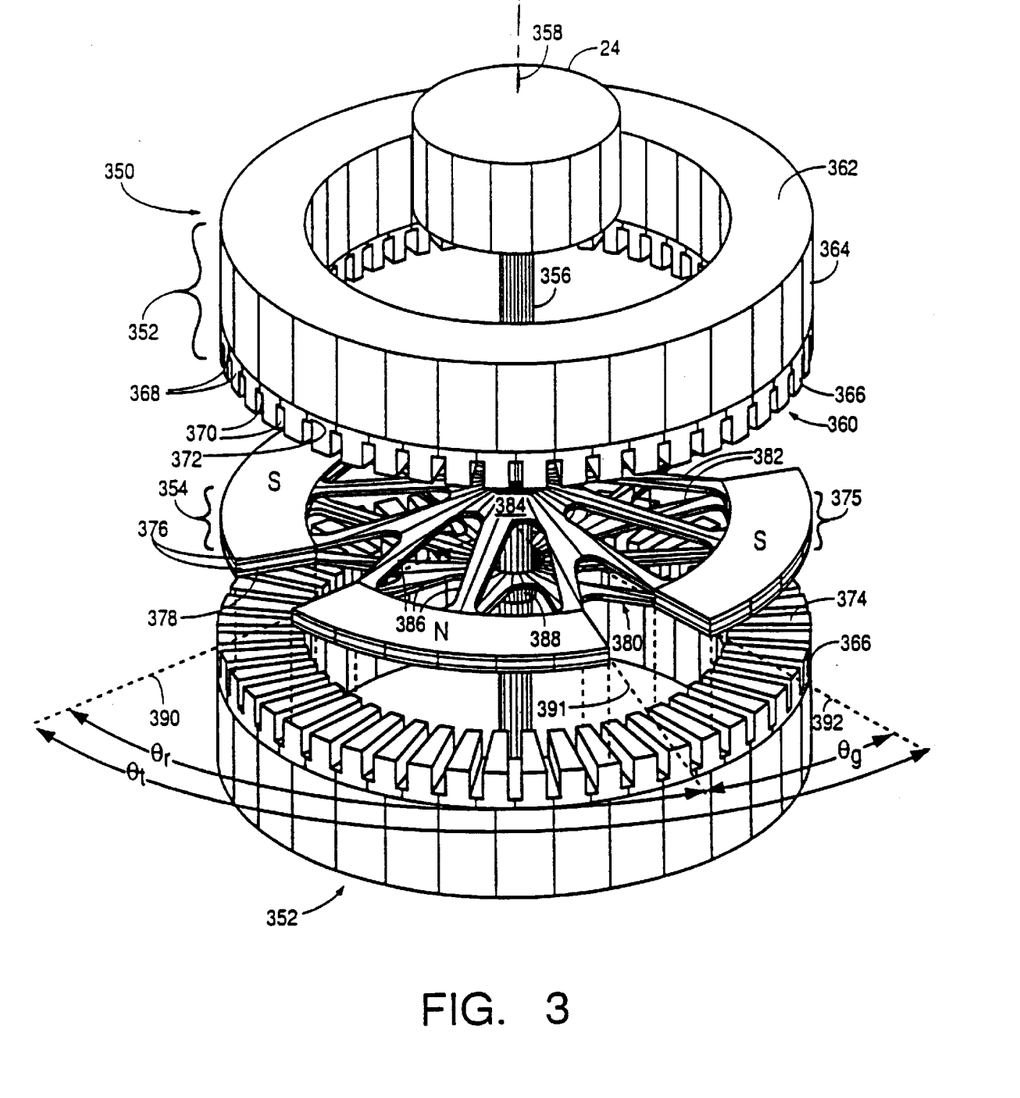
FIG. 3 is a computer-aided wireframe isometric partially exploded view of an axial-gap multipole brushless commutated torque motor illustrating the relationship of rotor pole segments and stator poles.

FIG. 3 shows selected electromagnetically active components of an axial-gap brushless commutated torque motor 350 having two stator assemblies 352 and a multipole rotor assembly 354. The position sensing device controlling commutation is the position encoder 24 described hereinabove. The multipole rotor assembly 354 is affixed to a shaft 356 supported in bearings (not shown) for rotation about a motor longitudinal axis 358. Each stator assembly 352 is a substantially solid ferromagnetic ring supported coaxially with the shaft 356 and multipole rotor assembly 354, said ferromagnetic ring having radial thickness, axial length, an inner and an outer circumference, a first axial face 360 disposed proximally to the multipole rotor assembly 354 and a second axial face 362 disposed distally from the multipole rotor assembly 354. As shown in the example of FIG. 3 the stator assembly 352 is a composite structure comprised of two ferromagnetic components—a wound cylindrical core 364 of ferromagnetic strip material and a stator pole assembly 366 molded of ferromagnetic powder and bonded to the wound cylindrical core 364 with structural adhesives. A plurality of radially-oriented poles 368 and stator winding slots 370 is disposed alternately at equal intervals about the first axial face 360 of the stator assembly 352. Each stator pole 368 extends axially from a stator pole root 372 adjacent to the closed ends of the two adjacent winding slots 370 to a stator pole 368 tip or face 374 disposed generally normal to the motor longitudinal axis 358 adjacent to the multipole rotor assembly 354. Each stator pole 368 extends radially from the inner circumference to the outer circumference of the stator assembly 352. A plurality of electrical conductors is placed in the stator winding slots 370 as described hereinbelow (FIG. 4).

The multipole rotor assembly 354 is comprised of a plurality of arcuate circumferentially spaced-apart ferromagnetic rotor pole sectors 375 having radial extent, angular extent, and axial thickness, each rotor pole sector 375 disposed normally to the motor longitudinal axis 358. Each rotor pole sector 375 is comprised of three layers: two pole pieces 376 of generally plane ferromagnetic material having radial extent, angular extent, and axial thickness separated axially by a magnet 378, said magnet 378 being an arcuate sector of permanently magnetized ferromagnetic material having radial extent, angular extent, and axial thickness disposed normally to the motor longitudinal axis and magnetized parallel to the motor longitudinal axis. The pole pieces 376 are bonded to the magnets 378 with structural adhesives. Each magnet is so magnetized that the polarity of the magnets 378 and their axially adjacent pole pieces 376 alternates from rotor pole sector 375 to rotor pole sector 375 around the multipole rotor assembly 354.

Each rotor pole sector 375 is joined to a hub 380. As shown in this FIG. 3 said hub 380 consists of two substantially identical hub-half structures 382. Two such hub-half structures 382 are mounted facing each other as mirror images on the shaft 356. Each hub-half structure 382 is comprised of a plurality of hub radial sectors 384 disposed at angles about the motor longitudinal axis 358 and each hub radial sector 384 is comprised of a plurality of radial spokes 386 joined to a common central bushing 388 and to the pole pieces 376. The two hub-half structures 382 are rotationally aligned on the shaft 356 so that their spokes 386 and the pole sectors 375 affixed thereto are in angular registration about the motor longitudinal axis 358. The central bushing 388 of each hub-half 382 is affixed to the shaft 356 so that said rotor pole sectors 375, said hub 380 and said shaft 356 rotate as a unit. In this example it may be seen that the spokes 386 of the hub 380 are disposed at angles to a plane normal to the motor longitudinal axis 358 to resist the axial magnetic attraction forces between multipole rotor assembly 354 and adjacent stators assemblies 352, particularly during motor 350 fabrication, when said axial forces may be unequal and large.

When assembled in a brushless commutated torque motor 350, the multipole rotor assembly 354 is located between to the two stator assemblies 352 with a narrow (0.010 in.) axial airgap (not shown) on each side of the rotor pole 375 sectors.

Magnetic flux from a pole piece 376 of the multipole rotor assembly 354 having a given magnetic polarity enters the face 374 of a given stator pole 368, leaves the root 372 of said stator pole 368, enters the wound cylindrical core 364, traverses an arc in the wound cylindrical core 364 of average length 360/(number of rotor pole sectors 375), enters the root 372 of another stator pole 368 and leaves the face 374 of said stator pole 368 to return to a rotor pole sector 375 of opposite magnetic polarity. Torque is produced by currents in conductors placed in the stator slots 370 interacting with the magnetic fields of the rotor pole sectors 375.

The large number of stator poles 368 limits the influence on motor torque of a single stator pole 368, i.e., if there are 12 stator poles 368 for each rotor pole sector 375, the influence of one stator pole 368 on total torque of that rotor pole sector 375 is roughly 8 percent, and if the stator poles 368 and their adjacent windings are alike within 10 percent and do not of there own geometry generate torque ripple, an overall rotor pole sector 375 and hence motor torque ripple of 1 percent is possible.

In this invention the rotor pole sectors 375 in the multipole rotor assembly 354 each subtends an arc substantially less than 360 degrees/(number of rotor pole sectors 375), and many (4 to 32) stator poles 368 are provided for each rotor pole sector 375. Since the stator poles 368 are disposed at equal intervals around the motor longitudinal axis 358, at any point in rotation of the multipole rotor assembly 354 several stator poles 368 lying between rotor pole sectors 375 are without axially adjacent rotor pole sectors 375.

This relationship is shown in FIG. 3, where dashed radial construction lines 390, 391, and 392 extend from the motor longitudinal axis 358 along the margins of certain of the rotor pole sectors 375. Dashed lines 390 and 392 extend along the clockwise edges of two adjacent rotor pole sectors 375, and are separated by an angle $\emptyset_t$ which is of extent equal to 360 degrees/(number of rotor pole sectors 375).

A third dashed radial line 391 extends along the counter-clockwise edge of rotor pole sector 375 having construction line 390 at its clockwise margin. The angular extent of the included rotor pole sector 375 is measured from 390 to 391 and is $\emptyset_r$. It is apparent that $\emptyset_r$ is less than $\emptyset_t$, said difference being $\emptyset_g$. Dashed vertical construction lines are projected from corners of the rotor sectors 375 bounded by radial construction lines 390, 391, and 392, indicating the axial projection of rotor pole sectors 375 on the stator pole assembly 366. It is seen that between adjacent rotor pole sectors 375 is a gap of "uncovered" stator poles 368 and the extent of this gap is $\emptyset_g$.

Because flux transfers between rotor pole sectors 375 during commutation and flux transfers may not be instantaneous or simultaneous, influenced by stator winding inductance and driving circuit impedance interactions and ferromagnetic hysteresis effects in stator assembly 352 and multipole rotor assembly 354, commutation is usually the least predictable source of torque ripple. In the configuration of this invention commutation is caused to occur in windings between stator poles 368 which lie in the gap $\emptyset_g$ between rotor pole sectors 375 and thus not axially adjacent to rotor pole sectors 375. Thus the commutating flux that affects the rotor pole sectors 375 is weak fringing flux from relatively distant stator poles 368 and stator windings, not the intense flux in the low-reluctance narrow airgaps wherein the rotor pole sectors 375 axially overlie stator poles 368, and the influence of commutating flux changes on total multipole rotor assembly 354 torque is thereby substantially reduced.

An attractive attribute of the composite stator assembly 352 comprised of powdered ferromagnetic pole assembly 366, having a working permeability of about 500, and a wound cylindrical core 364 of ferromagnetic strip having a working permeability of 50,000 or more, is that almost all of the flux from the stator pole roots 372 penetrates the high-permeability cylindrical ferromagnetic strip core 364 axially and has little inclination to traverse circumferentially in the lower-permeability ferromagnetic powder pole assembly 366 to adjacent stator poles 368, limiting the influence of stator poles 368 which are commutating on adjacent stator poles 368 which are not. Magnetically isotropic materials such as metallic glasses are generally superior to common silicon steel strip as wound cylindrical cores 364, as silicon steel strip usually has much higher longitudinal than transverse permeability and encourages circumferential flux movement in the ferromagnetic powder pole assembly 366, circumferentially extending the magnetic influence of a commutating stator pole 368 to adjacent stator poles 368. Metallic glass also possesses greater pulse permeability than does silicon steel, facilitating generation of short flux pulses to manage bearing breakaway friction as described hereinabove.

The disposition of multipole rotor assembly 354 and stator poles 368 shown has further advantages in limiting the influence of commutation on torque ripple with the small oscillating angular excursions characteristic of a rotary acoustic transducer assembly 21, as described hereinbelow.

Figure 4:
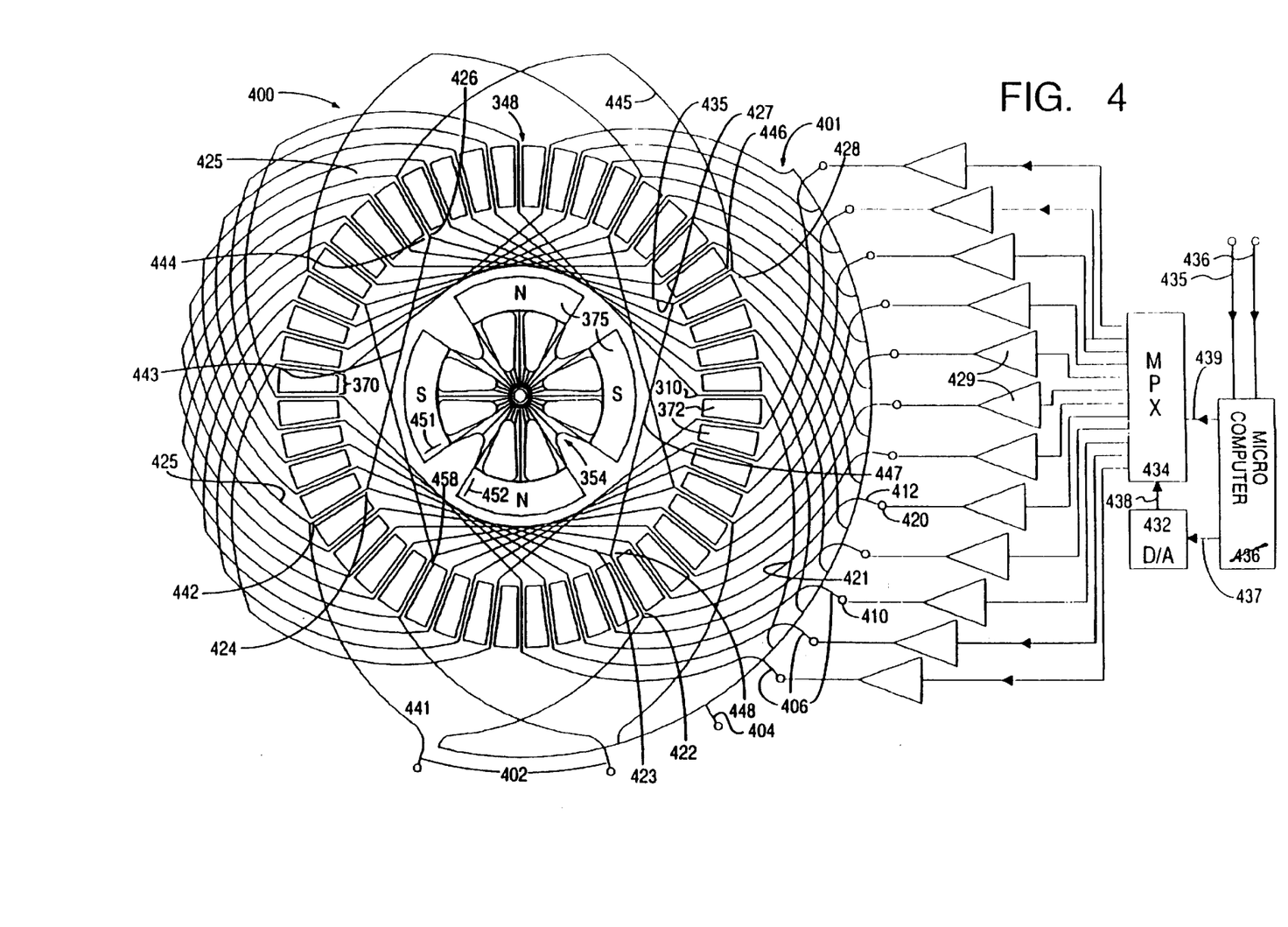
FIG. 4 is a schematic diagram of the winding pattern of an axial-gap multipole brushless electric motor and its associated driving electronics.

FIG. 4 is an example of a stator winding pattern 400 of this invention, presented in a traditional highly schematized way, and its driving electronics. A multipole rotor assembly 354 is surrounded by a plane representation of a stator pole assembly 366 (FIG. 3) having 48 stator pole faces 372 between which there are stator winding slots 370. As shown here, there are two groups of windings—the main windings 401 which ultimately, with the multipole rotor assembly 354 components, generate almost all of the motor torque, and the pulse windings 402, used for bearing breakaway friction management, which will be described hereinbelow. Both winding sets, main and pulse, share a common ground 404.

Individual winding conductors 406 of the main drive winding set 401 have, in this example, a wave winding pattern. Each of the 12 main winding conductors 406 is terminated in a terminal 410 and the common ground line 404. Each individual winding conductor 406 leaves a terminal 410 and traverses the stator pole assembly 366 winding slots 370 in such a way that the individual winding conductor 406 passes between the stator poles 368 in alternating radial directions, i.e., inner circumference to outer circumference followed by outer circumference to inner, and so forth until the individual winding conductor 406 returns to the common ground 404. For example, specific individual winding conductor 412 leaves terminal 420 and follows the path 421, 422, . . . 428 in numerical sequence, returning to the common ground 404. Though represented here as single turn for simplicity, in practice each of the main windings 401 will usually be comprised of many turns through the stator slots 370.

Each of the plurality of main drive windings 401 described hereinabove is driven by an individual power amplifier 429 controlled by electronics comprised of a position sensor 24 (not shown), a microcomputer 430, a D/A converter 432, and a microcomputer 430-controlled multiplexer 434 which distributes driving signals to individual power amplifiers 429 and thence to main windings 401. Torque control and rotor assembly 354 position information enter the microcomputer 430 on lines 435 and 436, respectively. Digital signals for individual stator main windings 401 pass through control line 437 to be converted to analog information on line 438. Main stator winding 401 selection addresses are on lines 439. Appropriate power amplifiers are economically available in groups of four amplifiers in a single integrated circuit, intended for use in automobile stereo radio receivers.

The multiturn main windings 401 have significant inductance and are difficult to drive with the brief pulses necessary to overcome breakaway friction as described hereinabove. In a d'Arsonval galvanometer noncommutating torque motor or the multipole brushless electric motor 350 configuration described immediately above (FIG. 3), the bearing breakaway friction is roughly 60 db. below maximum motor torque. This low-level torque may be delivered by pulse windings 402 having single conductor turns and sharing the same rotor assembly 354 and stator pole assembly 366 with the main drive windings 401 as shown in FIG. 4. A typical pulse winding 402 path is 441, 442, . . . 448, in numerical sequence, in all traverses of the stator pole assembly 366 the pulse winding 402 overlapping a main winding 401 in the same stator slot 366, as shown at 442, 444, 446, and 448. The pulse windings 402 may be driven by low-power circuitry (not shown) having greater speed than is economically attractive in main winding individual power amplifiers 429.

In the pulse winding 402 example shown, with a multipole rotor assembly 354 as shown in this FIG. 4, only two pulse windings 402 are necessary, as the two pulse windings 402 may be so disposed in the stator pole assembly 366 that for the ordinary angular rotation of a two-moving-vane rotary acoustic radiator 22, which is of the order of 100 to 130 degrees, one of the pulse windings 402 will always lie under a rotor pole sector 375 and thus be capable of generating multipole rotor assembly 354 torque. Such a disposition is indicated by the short radial lines 451,452 on the rotor pole sectors 375 in FIG. 4, indicating angular disposition of pulse windings 402 in stator slots 442 and 458 when the multipole rotor assembly 354 is centered. It may be seen that if the multipole rotor assembly 354 rotates up to 60 degrees counterclockwise (each rotor pole sector 375 of this example subtends 67.5 degrees), the pulse winding disposed in the stator slot 370 at 442 will remain subtended by the rotor pole sector 375 bearing line 451. Counterclockwise rotation will maintain an equivalent relationship between pulse winding at 458 and its subtending rotor pole sector 375 bearing line 452. Commutation between these two pulse windings 402 is straightforward, using only a single bit of rotational position information which may be derived from the angle registers in the microcomputer 81 (FIG. 2).

A further simplification can reduce the pulse windings from two to a single winding centered under the rotor pole sectors 375 at rest and driven only if the resting rotor pole sector 375 subtends the pulse winding, i.e., for the rotor pole sector 375 to "uncover" the pulse winding requires multipole rotor assembly 354 angular excursions of roughly ±30 degrees, within 6 db. of maximum output (±60 degrees). At this multipole rotor assembly 354 excursion level bearing static frictional effects are therefore 54 db. down (6 db–60db), unlikely to be noticed if the pulse windings are not energized at all.

In a rotary acoustic transducer assembly 21 the amplitude of rotation decreases with frequency for a given perceived sound level, the lowest-audible-frequency sounds are not commonly present, and most listening is done at levels 10 to 30 db below peak. The consequence of these factors is that most multipole rotor assembly 354 excursions are of the order of 10 percent or less of maximum. The rotor pole sector 375 and stator assembly 352 configuration of FIG. 3 has considerable potential for reduction of torque ripple and attendant sound distortion if hysteresis is introduced into stator pole commutation.

Figure 5A:
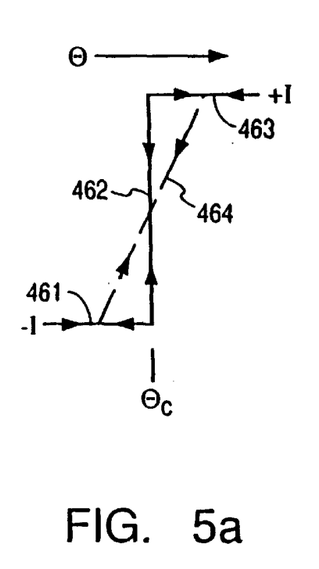
FIG. 5a is a schematic representation of stator winding driving current commutation transitions of a typical electronically commutated brushless electric motor.

FIG. 5a is a schematic representation of traditional electronic commutation. The stator main winding 401 current I, varying from −I to +I, is shown along the ordinate and the abscissa is multipole rotor assembly 354 angular position Ø. As Ø increases, at some position $Ø_c$ the polarity of stator main winding current I reverses from −I to +I. The current I path as f(Ø) is 461,462,463. When the multipole rotor assembly 354 rotation reverses the stator main winding 401 current I is reversed at the same rotational point $Ø_c$ and the path as f(Ø) is 463,462,461. This retrace of the identical path is idealized, and, as has been described hereinabove, is generally not achieved primarily because of stator winding inductance and driving source impedance interactions and stator assembly hysteresis: the consequence is commutation torque ripple. Flux may be reversed gradually, over a period greater than that of the stator main winding 401 inductance and driving amplifier 429 impedance time constant, in order to minimize these effects, as suggested by the bidirectional dashed line 464, but the effect may be to create an effective gap in motor torque as commutating windings are midway through the current transition.

Figure 5B:
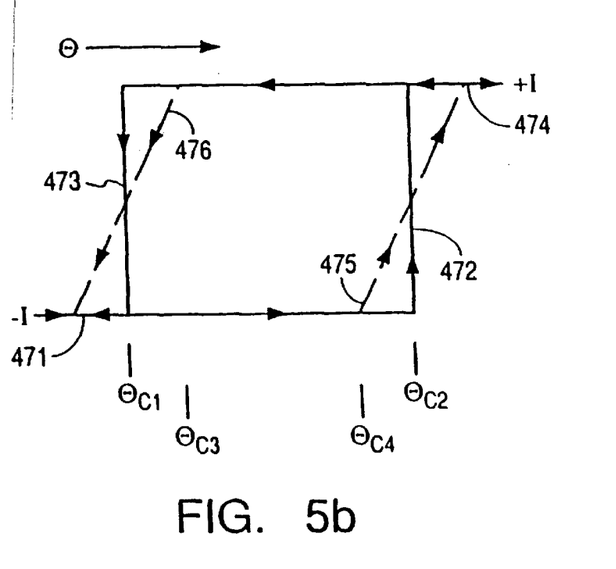
FIG. 5b is a schematic representation of stator winding driving current commutation transitions of an electronically commutated brushless electric motor of the present invention in which hysteresis has been introduced to said commutation transitions.

The current paths for changes in the two transitions −I to +I and +I to −I may be rotationally separated as shown in FIG. 5b. Here the −I to +I transition is at rotational position $Ø_{c2}$, following path 471, 472, 474 as f(Ø) and the +I to −I transition is at $Ø_{c1}$, following path 474, 473, 471 as f(Ø).

The consequence of this commutation hysteresis between $\emptyset c1$ and $\emptyset c2$ is that the multipole rotor assembly 354 may rotate between and $\emptyset_{c1}$ without $\emptyset_{c2}$ without commutating at all, thus introducing no commutation torque ripple to the multipole rotor assembly 354, and no distortion from this source. Gradual commutation as suggested by paths 475 and 476, may be used to reduce inductive effects in the overall stator magnetic field as commutation occurs where rotor pole sectors 375 do not subtend the commutating stator poles 368, though the commutation-free region is reduced to the angular sector between $\emptyset_{c3}$ and $\emptyset_{c4}$.

In a typical application to a rotary acoustic transducer assembly 21 a hysteresis angle $\emptyset_{c2}-\emptyset_{c1}$ might be 7.5 degrees, equal to the width of a stator pole 368 and adjacent stator slot 370 in the 48-pole example as described in FIGS. 3 and 4. This would mean that at the lowest frequency of 20 Hz, where the maximum multipole rotor assembly 354 excursion is perhaps 120 degrees, commutation would become limited starting at—24 db (16:1 down), from peak output; at 80 Hz, where multipole rotor assembly 354 excursion is reduced by 4:1, the transition would start to occur at −12 db. (only 4:1 down) from peak output. With sound output levels 6 db. further down, commutation ceases altogether. At listening sound levels 10–30 db. below peak, which is where a high-quality brush-commutated motor produces distortion of unacceptable levels (10 percent or more) with further relative distortion increases with decreasing sound level, the brushless commutated motor of this invention is transitioning from a commutating region having distortion in the 1 percent region to a non-commutating state akin to that of the d'Arsonval galvanometer torque motor drive described hereinabove. There is no relative increase of commutation-induced distortion below −30 db. as there is no commutation in this region.

Torque ripple from sources other than commutation, such as uneven stator pole assembly flux distribution, persists when the motor is not commutating, but may be reduced in traditional ways, primarily, in an axial-gap brushless commutated torque motor 350 such as that of FIG. 3, by increasing the number of stator poles 368 and by skewing rotor pole sector 375 circumferential margins and stator poles 368 from their radial alignment in the plane normal to the motor longitudinal axis 358. Additional ripple-reduction techniques may include using rotor pole sectors 375 having differing angular extents and use of unequal angular disposition of diametrically-opposed rotor pole sector 375 pairs about the motor longitudinal axis 358, e.g., offsetting one diametrically opposed rotor pole sector 375 pair by half the combined width of a stator pole 368 and stator winding slot 370.

The axial-gap brushless commutated torque motor 350 described herein is a satisfactory alternative to a galvanometer-type torque motor drive for use in a rotary acoustic transducer assembly 21. Torque linearization techniques described hereinabove for the galvanometer-type torque motor are applicable and reduce distortion levels below the intrinsic level of the brushless commutated torque motor 350 and increase its linear torque range, as ferromagnetic saturation effects can be partially compensated by changes in main stator winding 401 drive. These torque linearization techniques will compensate for the peculiarities of each individual motor, since each rotational position $\emptyset$ within the operation range is individually mapped following motor assembly and periodically thereafter. Compensated motor peculiarities may include such mischances as a chip on a single stator pole 368 acquired during operational use. Provision of breakaway-friction flux pulses is simplified by the use of separate stator pulse windings 402.

In general, the apparatus of the present invention can be generally characterized as a rigidly structured microcomputer-controlled transducer comprised of rigid movable vanes rotating in a rigid ported cylinder having a variety of vane and port configurations which is capable of reproducing sound with low distortion from a high frequency crossover point of 80 Hz down to well below the 20 Hz lower limit of the audio frequency spectrum. Even in a small cabinet, the frequency response in and immediately below its working bandwidth is substantially flat and without resonances without use of negative feedback.

While certain embodiments of this invention have been described, other embodiments of this invention will be obvious in view of this disclosure. Accordingly, the above description is meant to be illustrative only and not limiting.

What is claimed is:

1. A brushless commutated torque motor comprising:
   a shaft having a longitudinal axis;
   a position sensor;
   a rotor having a plurality of permanently magnetized rotor pole sectors, said rotor mounted for rotation upon said shaft; and
   a stator having a plurality of stator poles and stator winding slots disposed alternately therein, said stator slots having stator windings therein driven by individual power amplifiers in response to a control signal, said stator having commutation between stator windings controlled by sensing of rotor angular position by said position sensor, each rotor pole sector being configured and disposed such that a plurality of stator poles are axially adjacent to said rotor pole sector and each rotor pole sector is angularly separated from adjacent rotor pole sectors by a selected number of stator poles, and wherein during operation electronically-controlled commutation occurs in those stator windings not axially adjacent to rotor pole sectors.

2. A brushless commutated torque motor as in claim 1 having electronic commutation between stator windings occurring gradually during angular travel of the rotor, said gradual commutation controlled by electronic sensing of rotor angular position.

3. A brushless commutated torque motor, suitable for oscillatory operation, wherein during operation commutation positions for a given stator winding occur at one angular position for a given direction of stator winding current commutation polarity change and at another angular position for a stator winding current commutation polarity change of opposite direction such that there is an angular gap or hysteresis between the two commutation angular positions for a given stator winding such that for low amplitude oscillations less than the hysteresis amplitude, commutation is eliminated.

4. A brushless commutated torque motor as in claim 3 wherein during operation commutation between stator winding phases occurs gradually during rotational travel of the rotor, said gradual commutation being controlled by electronic sensing of rotor angular position.

5. A brushless commutated torque motor as in claim 1 including microcomputer control means for calibrating motor torque linearity as a function of rotational position and driving current amplitude and operating on the control signal to compensate for torque motor nonlinearity.

6. A brushless commutated torque motor as in claim 1 including breakaway-friction stator pulse windings separate from stator main windings.

7. A brushless commutated torque motor as in claim 1, having an even number of rotor poles and unequal angular disposition of diametrically-opposed rotor pole pairs about the motor longitudinal axis.

8. A brushless commutated torque motor comprising:

a shaft;

a position sensor;

a rotor having a plurality of permanent magnet rotor pole sectors, said rotor mounted for rotation upon said shaft; and a stator having a plurality of stator poles and stator winding slots disposed alternately thereon, each of said stator winding slots having stator windings therein driven by an individual power amplifier in response to a control signal, said stator having commutation between stator windings controlled by sensing of rotor angular position by said position sensor, each rotor pole being configured and disposed such that a plurality of adjacent stator windings having the same polarity is axially adjacent to said rotor pole sector and each rotor pole sector is angularly separated from adjacent rotor pole sectors by a selected number of stator windings, and wherein during operation electronically-controlled commutation occurs in those stator windings not axially adjacent to rotor pole sectors.

9. A brushless commutated torque motor as in claim 8 wherein during operation commutation positions for a given stator winding occur at one angular position for a given direction of stator winding current commutation polarity change and at another angular position for a stator winding current commutation polarity change of the opposite direction such that there is an angular gap or hysteresis between two commutation angular positions for a given stator winding such that for low-amplitude rotary oscillations less than the hysteresis amplitude, commutation does not occur.

10. A brushless commutated torque motor as in claim 8 including microcomputer control means for calibrating motor torque linearity as a function of rotational position throughout the range of rotation, storing the calibrations for each rotor position in tables, and operating on the control signal using linearity data stored in said tables to compensate for torque motor nonlinearity.

11. A brushless commutated torque motor as in claim 8, including breakaway-friction stator pulse windings separate from stator main windings.

12. A brushless commutated torque motor as in claim 8, having an even number of rotor poles and unequal angular disposition of diametrically-opposed rotor pole pairs about the motor longitudinal axis.

13. A brushless commutated torque motor comprising;

a shaft;

a position sensor;

a rotor having a plurality of permanent magnet rotor pole sectors, said rotor mounted for rotation upon said shaft, each rotor pole and each rotor pole sector being angularly separated from adjacent rotor pole sectors by an angular space;

a stator having a plurality of stator poles and stator winding slots disposed alternately thereon, each of said stator winding slots having stator windings therein being configured and disposed such that a plurality of adjacent stator windings having the same polarity is axially adjacent to each rotor pole sector; and a stator commutation means controlled by sensing of rotor angular position by said position sensor and wherein during operation electronically-controlled commutation occurs only in those stator windings not axially adjacent to rotor pole sectors.

14. A brushless commutated torque motor as in claim 13 wherein during operation commutation positions for a given stator winding occur at one angular position for a given direction of stator winding current commutation polarity change and at another angular position for a stator winding current commutation polarity change of the opposite direction such that there is an angular gap or hysteresis between two commutation angular positions for a given stator winding such that for low-amplitude rotary oscillations less than the hysteresis amplitude, commutation does not occur.

15. A brushless commutated torque motor as in claim 13 including microcomputer control means for calibrating motor torque linearity as a function of rotational position throughout the range of rotation, storing the calibrations for each rotor position in tables, and operating on the control signal using linearity data stored in said tables to compensate for torque motor nonlinearity.

16. A brushless commutated torque motor as in claim 13, including breakaway-friction stator pulse windings separate from stator main windings.

17. A brushless commutated torque motor comprising:

a shaft;

a position sensor;

a rotor having a plurality of permanent magnet rotor pole sectors, said rotor mounted for rotation upon said shaft, each rotor pole and each rotor pole sector being angularly separated from adjacent rotor pole sectors by an angular space;

a stator having a plurality of stator poles and stator winding slots disposed alternately thereon, each of said stator winding slots having stator windings therein being configured and disposed such that a plurality of adjacent stator windings having the same polarity is axially adjacent to each rotor pole sector; and a stator commutation means controlled by sensing of rotor angular position by said position sensor and wherein during operation electronically-controlled commutation occurs in those stator windings adjacent to stator windings having opposite polarity.

18. A brushless commutated torque motor as in claim 17 wherein during operation commutation positions for a given stator winding occur at one angular position for a given direction of stator winding current commutation polarity change and at another angular position for a stator winding current commutation polarity change of the opposite direction such that there is an angular gap or hysteresis between two commutation angular positions for a given stator winding such that for low-amplitude rotary oscillations less than the hysteresis amplitude, commutation does not occur.

19. A brushless commutated torque motor as in claim 17 including microcomputer control means for calibrating motor torque linearity as a function of rotational position throughout the range of rotation, storing the calibrations for each rotor position in tables, and operating on the control signal using linearity data stored in said tables to compensate for torque motor nonlinearity.

20. A brushless commutated torque motor as in claim 17, including breakaway-friction stator pulse windings separate from stator main windings.

\* \* \* \* \*